United States Patent [19]

Brower

[11] 4,416,444
[45] Nov. 22, 1983

[54] UNDERWATER CUTTING ROD

[76] Inventor: Jerome S. Brower, P.O. Box 1768, Pomona, Calif. 91769

[21] Appl. No.: 479,461

[22] Filed: Mar. 28, 1983

[51] Int. Cl.³ .............................................. B23K 9/18
[52] U.S. Cl. ........................................ 266/48; 75/27; 219/69 R; 219/69 W; 219/69 C; 219/69 E; 219/70; 219/72
[58] Field of Search ............ 266/48; 148/9 R; 75/27; 219/68, 69 R, 69 W, 69 C, 69 E, 70, 72, 130.4; 361/257

[56] References Cited

U.S. PATENT DOCUMENTS

| | | | |
|---|---|---|---|
| 2,569,956 | 10/1951 | Schiltknecht | 75/27 |
| 2,997,165 | 8/1961 | Leuthy et al. | 75/27 |
| 3,260,076 | 7/1966 | Humberg | 266/48 |
| 3,507,230 | 4/1970 | Seib | 431/99 |
| 4,114,863 | 9/1978 | Campana | 266/48 |

Primary Examiner—W. Stallard
Attorney, Agent, or Firm—Sanford Astor

[57] ABSTRACT

A tubular electrode for use in a cutting torch which is primarily used in underwater cutting operations comprising a cutting rod made from tubing produced by rolling and forming copper coated sheet steel into the tubular shape which acts as a carrier for a plurality of metallic rods.

12 Claims, 2 Drawing Figures

U.S. Patent     Nov. 22, 1983     4,416,444

UNDERWATER CUTTING ROD

BACKGROUND OF THE INVENTION

This application is an improvement of my U.S. Pat. No. 4,182,947 issued Jan. 8, 1980. That patent describes an oxygen, electric cutting torch system for underwater cutting operations comprising cutting electrodes comprising a metallic tube, a plurality of rods within the tube and a layer of insulating material substantially covering the exterior surface of the tube.

The device of my prior patent requires a source of electrical power for starting the burning of the electrode and if desired the electrical power is kept operating during the cutting operation even after the electrode is burning. The present equipment used to provide this electrical power is large, bulky and expensive due to the amount of power required.

OBJECT OF THE INVENTION

It is an object of the present invention to provide an electrode for a cutting torch which reduces the need for electrical power by increasing the conductivity of the electrode itself.

It is a further object of this invention to provide a cutting electrode which substantially reduces the need for electrical power, thus allowing much smaller and much less expensive electrical production equipment to supply this power.

It is still a further object of this invention to provide a cutting electrode for an underwater cutting torch which provides added safety to the operator by allowing a far less need for electrical power than is presently required.

DESCRIPTION OF THE INVENTION

These and other objects of the invention will be described by the accompanying description and drawings in which.

Figure 1:
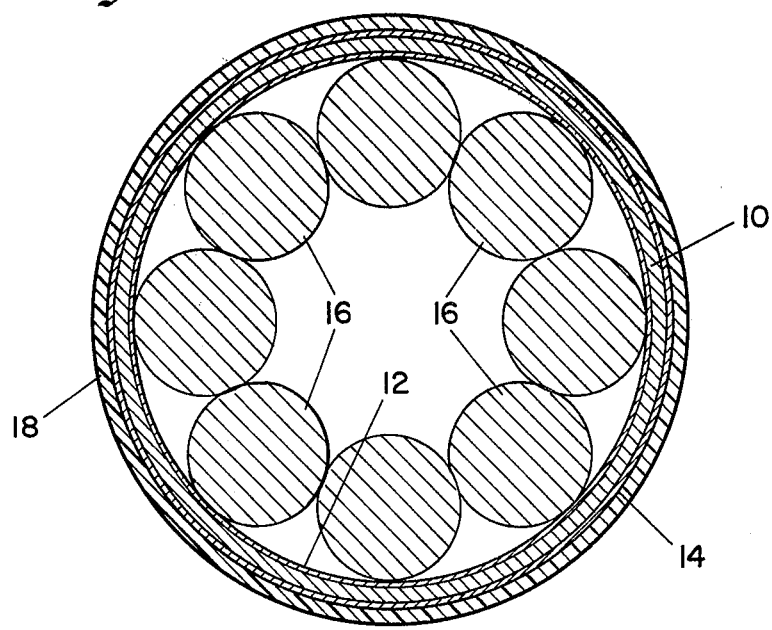
FIG. 1 is an enlarged sectional end elevation of the electrode.

Referring now to the drawings there is shown a relatively thin-walled lightweight steel tube 10 which provides the casing of the cutting rod or electrode. The steel tube 10 is coated both on the inside surface, on the outside surface, with a thin coating of copper 12, 14. Inside of the tube 10 is a plurality of metallic rods 16. The rods can be all a ferrous metal, such as steel or can be a combination of steel rods and rods made from another metal such as a metal selected from the group consisting of aluminum, magnesium, titanium, tungsten, molybdenum, or alloys thereof. The cutting rod will operate satisfactionly with a range of ratios between about 3:1 steel to, for example, aluminum and about 10:1 steel to aluminum. A ratio of 7:1 is preferred for example.

The cutting rod can be used in the form shown at ground level on the surface, however, for underwater use the tube 10 is supplied with an exterior coating 18 which is electrically nonconductive. It is a material which is preferably a plastic such as epoxy, vinyl, acrylic or urethane, which acts as an insulative and protective coating for tube 10. The coating 18 being an insulator, prevents inadvertant ignition through the side of the rod should the rod be accidentally touched against an electrially conductive and grounded member. It thus prevents side-rod sticking as well as side-rod arcing and blowout, common problems.

Figure 2:
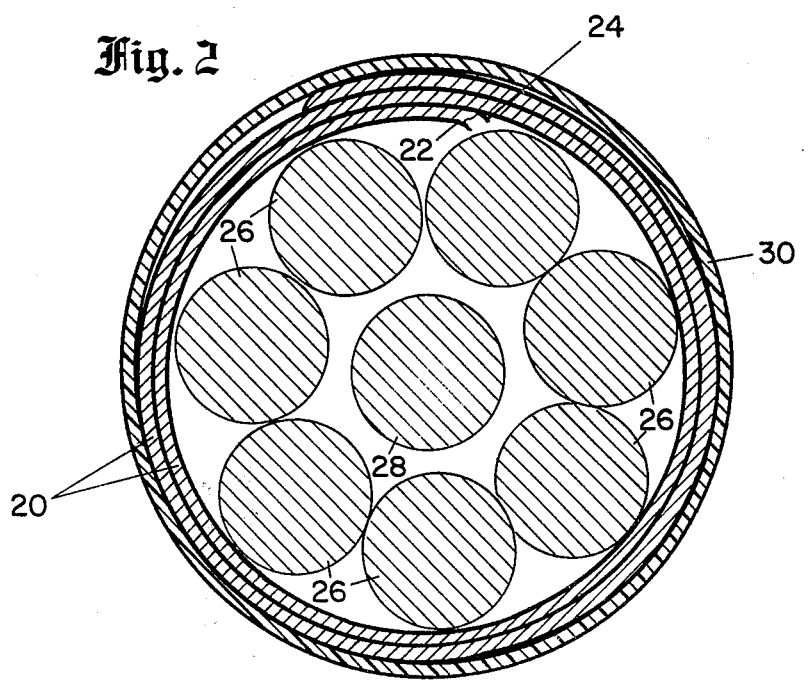
FIG. 2 is an enlarged sectional end elevation of a second embodiment of this invention.

Referring now to FIG. 2, there is shown a second embodiment of the invention in which the steel tube 20 having inside copper coated surface 22 and outside copper coaated surface 24 is manufactured by rolling copper coated steel sheet into a convoluted shape which gives a tube 20 as shown. Rods 26 as described are placed inside of the tube 20. The rods 26 in this example are placed in a slightly different configuration with a center rod 28. The particular configuration is at the choice of the operator but the configuration should provide a passage for the oxygen to pass down the center of the tube between the configuration of rods. A protective coating 30 is shown as in FIG. 4, for underwater use.

The cutting rod shown in FIG. 2 is manufactured by rolling steel plate, which has been flash plated with copper, on a mandrel and then hydrogen brazing to seal the layers together to hold the tubular shape. The sheet is prepared by either electroplating, or hot dipping both surfaces with an excellent electrical conductor, such as, but not limited to, copper, tin or other conductive metal. This process produces a tube with the conductive metal sandwiched between the continuous layers of steel. The copper or other metallic laminant, acts as an adhesive as well as a conductive medium for the electrical power necessary for ignition of the rod. The brazing process melts the copper between the layers of steel and causes the tube to conform to the cylindrical shape of the mandrel. The purpose of the copper or other sandwiched metal between the layers of steel in the wrapper tube, is to decrease the tubes' electrical resistance, and greatly improve its conductivity. The copper surfaces are the electrical path for the assembled rod. The increased conductivity of the rod allows it to function at extremely low amperages, far below that required by other cutting rods. A standard automobile or motorcycle storage battery can be readily used to start the burning of the cutting rod underwater. This eliminates the requirement for large, bulky, and expensive energizing equipment, such as big amperage welding machines which are required by other manufactured cutting rods.

The interior of this rolled and laminated tubing is such that it will accept a plurality of small diameter rods, selected from a group, consisting of steel alone, steel and aluminum, steel and magnesium, steel and titanium, or steel and tungsten or molybdenum. The inserted rods are arranged peripherally about the inside circumference of the tube. A gas channel or tunnel, running normal to the diameter of the tube is created to provide an unobstructed passage for the oxygen to the tip of the rod which is its point of contact with the workpiece.

A spark is struck between the tip of the rod and the grounded workpiece. When the exposed end is energized from the electrical power source, the introduction of oxygen through the gas channel in the tube starts the initial chemical reaction (oxidation/reduction). A continuous thermitic reaction results, producing an extremely high heat source, one capable of melting any element, alloy, mineral or mixture of minerals coming in contact with the burning tip, including the material used as the heat shield on the space shuttle. This reaction takes place in air on the surface, or underwater, without regard to the type of external atmosphere in which the burning takes place. When the power source is removed, the rod will continue to burn until the oxygen source is removed. When the electrical power is shut off, the rod will burn as long as oxygen continues to be introduced through the system.

Exterior insulation on the rod is required in underwater operations to keep it from side arcing with the workpiece. The rod burns in the same manner as a cigarette. It starts at one end and progressively consumes towards the collet holding the rod in the handle of the holder, stopping, when the operator shuts off the oxygen supply.

If the material to be cut is nonconductive, a conductive starting or striker plate is used to complete the electrical circuit. The rod ignites when contact is made. The workpiece or striker plate is an integral part of the circuit and completes the electrical loop. The striker plate consists of a small piece of conductive material attached to the grounding clamp. The generator, battery, or welding machine is turned on, and simultaneously, the tip of the rod is touched to the striker plate. A spark is generated, and at the same time the oxygen is introduced through the system to the rod tip. The rod starts burning and continues to burn even when the electrical power is shut off. This novel feature allows the rod to be used to burn nonconductive as well as conductive materials under all circumstances. This process functions on the surface as well as underwater. The cutting action will continue in air or underwater until the oxygen source is removed or until the rod is totally consumed. Other types of underwater cutting rods will not sustain burning when the power is off, cannot function without power and cannot burn materials other than steel, underwater or on the surface. This tubular rod is especially effective when used to burn cast iron, stainless steel, monel, inconel, copper, brass, rubber, concrete, wood, etc.

Metals or concrete, which resist melting by currently produced cutting rods, on the surface or underwater, are readily cut or melted with this tubular oxy-arc cutting rod.

A cutting test was conducted to compare the rods of this invention with standard rods available on the market now.

The test facility used was an 18,000 gallon 10 foot deep training tank for divers.

Two types of metal were cut:
A. 7/16' sheet pile with two interlocks, 29" in width.
B. 5/16" hull plate with 2 riveted flanges, covered with light marine fouling (algae, rust, and small barnacles). The plates were riveted together forming two interlock areas on each diver's piece. The continuous cuts covered a distance of 24".

Procedure: The clean plate was lowered into the tank and clamped in a vise on a sawhorse. The diver first made four single-rod cuts with the rod of this invention, then four more single rod cuts with a standard rod, attempting to get maximum cutting distance with each rod. Then the diver made a cut all the way across the plate, first using the rod of this invention then using a standard rod. Immediately thereafter, the clean plate was removed and the fouled plate was lowered into place, where the above procedure was repeated.

Variations in testing procedure:

Diver #1 (inexperienced) and Diver #2 (experienced) made horizontal cuts, starting at the knuckle or flange. This sharply penalized the standard rod for distance since on several tries a single standard steel tubular rod was unable to cut through the knuckle at the start. Accordingly, the procedure was changed to vertical cuts, where the knuckles or flanges would not interfere. However, in all cases the continuous cuts were made across the width of the piece, involving both the interlocks.

Diver #3 and #4 turned both pieces on their sides so that the single rod cuts with both rods was horizontal, and the through-plate cut was vertical.

Divers #1 and #2 made cuts with the rod of this invention first. Divers #3 and #4 reversed this order. The rod of this invention cut almost three (3) times as far as the standard tubular steel rod.

In the tests, the average distance cut by all divers with a single rod of this invention on fouled hull plate and clean sheet pile was 15.1". The average distance cut with the standard rod was 5.1".

For a given cutting distance, the rods of this invention took less than half the time and half the rods as the standard tubular steel rod.

The four divers took an average of 3.5 rods and 3.5 minutes to cut both sheets with the rods of this invention. With standard rods they took an average of 7.5 rods and 15.7 minutes to do the same work.

In every case, inexperienced divers using the rods of this invention outcut experienced divers using standard rods.

The two inexperienced divers averaged 12.4" per single rod cut over both sheets with the rods of this invention. Their instructors, using standard rods, averaged 6.1" per single rod cut. On the continuous cuts, the student divers averaged 3.4 rods and 6.8 minutes to complete the average cut. The experienced divers were able to make the same cut in an average of 17.8 minutes, using 8.1 rods.

Having described my invention, I claim:

1. An electrode for use in a cutting torch comprising a metallic tube coated on the inside and outside with a layer of conductive material, a plurality of rods within said tube, said rods selected from the group consisting of steel, aluminum, magnesium, titanium, tungsten, molybdenum or alloys thereof.

2. The device of claim 1 in which the conductive material is selected from the group consisting of copper and tin.

3. The device of claim 1 in which the metallic tube is coated outside of the layer of conductive material with a layer of insulative material.

4. The device of claim 3 in which the insulative material is plastic.

5. The device of claim 1 in which the plurality of rods comprises steel and one other metal in a ratio of from 3:1 steel to 10:1 steel to the other metal.

6. The device of claim 1 in which the plurality of rods are all steel.

7. An electrode for use in a cutting torch comprising a metallic tube formed by rolling steel sheet coated on both sides with a conductive material into a convoluted tubular shape, a plurality of rods within said tube, said rods selected from the group consisting of steel, aluminum, magnesium, titanium, tungsten, molybdenum, or alloys thereof.

8. The device of claim 7 in which the conductive material is selected from the group consisting of copper and tin.

9. The device of claim 7 in which the metallic tube is coated outside of the layer of conductive material with a layer of insulative material.

10. The device of claim 9 in which the insulative material is plastic.

11. The device of claim 7 in which the plurality of rods comprises steel and one other metal in a ratio of from 3:1 steel to 10:1 steel to the other metal.

12. The device of claim 7 in which the plurality of rods are all steel.

* * * * *